United States Patent
Braun

(10) Patent No.: US 9,334,123 B2
(45) Date of Patent: May 10, 2016

(54) CONVEYOR SCREW FOR A MATERIAL CONVEYOR SYSTEM OF A CONSTRUCTION MACHINE

(71) Applicant: JOSEPH VOEGELE AG, Ludwigshafen/Rhein (DE)

(72) Inventor: Arthur Braun, Deidesheim (DE)

(73) Assignee: JOSEPH VOEGELE AG (DE)

( * ) Notice: Subject to any disclaimer, the term of this patent is extended or adjusted under 35 U.S.C. 154(b) by 0 days.

(21) Appl. No.: 14/186,354

(22) Filed: Feb. 21, 2014

(65) Prior Publication Data
US 2014/0238826 A1 Aug. 28, 2014

(30) Foreign Application Priority Data
Feb. 22, 2013 (EP) ..................................... 13000906

(51) Int. Cl.
| | | |
|---|---|---|
| B65G 33/08 | (2006.01) | |
| B65G 33/36 | (2006.01) | |
| E01C 19/48 | (2006.01) | |
| B23K 20/12 | (2006.01) | |
| B23K 20/22 | (2006.01) | |
| B65G 33/24 | (2006.01) | |
| B65G 33/34 | (2006.01) | |

(52) U.S. Cl.
CPC ................ *B65G 33/08* (2013.01); *B23K 20/12* (2013.01); *B23K 20/129* (2013.01); *B23K 20/22* (2013.01); *B65G 33/24* (2013.01); *B65G 33/34* (2013.01); *B65G 33/36* (2013.01); *E01C 19/48* (2013.01); *B23K 2201/20* (2013.01); *B23K 2203/18* (2013.01)

(58) Field of Classification Search
CPC ........ B65G 33/08; B65G 33/10; B65G 33/34; B65G 33/36; E01C 19/48; B23K 20/12
USPC .................................................. 198/657–677
See application file for complete search history.

(56) References Cited

U.S. PATENT DOCUMENTS

| | | | | |
|---|---|---|---|---|
| 3,015,258 | A | * | 1/1962 | Apel et al. ..................... 404/106 |
| 3,213,703 | A | | 10/1965 | Fitzgerald |
| 3,270,633 | A | | 9/1966 | Holland |
| 3,360,107 | A | | 12/1967 | Lockwood |
| 3,443,680 | A | | 5/1969 | Brill |
| 3,577,746 | A | | 5/1971 | Dolan |

(Continued)

FOREIGN PATENT DOCUMENTS

| | | | |
|---|---|---|---|
| DE | 29915798 | U1 | 3/2000 |
| DE | 1020006016099 | A1 | 10/2007 |

(Continued)

OTHER PUBLICATIONS

Wikipedia, "Friction Welding" Feb. 2012.*

(Continued)

*Primary Examiner* — Mark A Deuble
(74) *Attorney, Agent, or Firm* — Brooks Kushman P.C.

(57) ABSTRACT

The disclosure relates to a conveyor screw for a material conveyor system of a construction machine. The conveyor screw comprises a conveyor section which is configured to convey bulk material, and a driving section which is designed to receive a driving torque or a driving force and to transmit it to the conveyor section. The disclosure is characterized in that the conveyor section and the driving section are connected to each other by friction welding.

16 Claims, 2 Drawing Sheets

(56) References Cited

U.S. PATENT DOCUMENTS

| | | | |
|---|---|---|---|
| 3,967,912 A | 7/1976 | Parker | |
| 4,037,713 A | 7/1977 | Soliman et al. | |
| 4,049,112 A | 9/1977 | Tyslauk | |
| 4,429,782 A | 2/1984 | Pierson | |
| 4,437,564 A | 3/1984 | Redder et al. | |
| 4,772,156 A | 9/1988 | Craig | |
| 5,105,936 A | 4/1992 | Stapper et al. | |
| 5,232,068 A | 8/1993 | Bandy, Jr. | |
| 5,279,501 A * | 1/1994 | Shelley | 404/118 |
| 5,927,479 A | 7/1999 | Merten et al. | |
| 5,947,265 A | 9/1999 | Merten et al. | |
| 5,980,153 A * | 11/1999 | Plemons et al. | 404/72 |
| 6,064,030 A | 5/2000 | Sato | |
| 6,227,354 B1 | 5/2001 | Howden et al. | |
| 6,279,734 B1 | 8/2001 | Meya et al. | |
| 6,390,283 B1 * | 5/2002 | Goodwin | 198/664 |
| 6,607,074 B2 | 8/2003 | Klabisch et al. | |
| 7,128,201 B2 | 10/2006 | Jones | |
| 7,207,435 B2 | 4/2007 | Bude et al. | |
| 7,549,531 B2 | 6/2009 | Hosch et al. | |
| 7,673,741 B2 | 3/2010 | Nemedi | |
| 8,021,078 B2 | 9/2011 | Lamb | |
| 8,042,682 B2 | 10/2011 | Ertel | |
| 8,474,605 B2 | 7/2013 | Lauwers et al. | |
| 8,490,779 B2 | 7/2013 | Schurer et al. | |
| 8,646,593 B2 * | 2/2014 | Andersson et al. | 198/611 |
| 8,833,202 B2 | 9/2014 | Tateno | |
| 2013/0043107 A1 | 2/2013 | Shah | |
| 2014/0027247 A1 | 1/2014 | Cox et al. | |

FOREIGN PATENT DOCUMENTS

| | | | |
|---|---|---|---|
| JP | 61068013 U | 5/1986 | |
| JP | 04231505 A | 8/1992 | |
| JP | 08035751 A | 2/1996 | |
| JP | 09025644 A | 1/1997 | |
| JP | 09302612 A | 11/1997 | |
| JP | 11322040 A | 11/1999 | |
| JP | 3382366 B2 | 3/2003 | |
| JP | 2003329051 A | 11/2003 | |
| JP | 2004308751 A | 11/2004 | |
| JP | 2004316859 A | 11/2004 | |
| JP | 3601798 B2 | 12/2004 | |
| JP | 2011153516 A | 8/2011 | |
| JP | 2012002383 A | 1/2012 | |
| WO | 2012090300 A1 | 7/2012 | |

OTHER PUBLICATIONS

European Office Action Dated Jun. 26, 2013, Application No. 13000899.8-1707, Applicant Joseph Voegele AG, 6 Pages.
European Office Action Dated Jul. 1, 2013, Application No. 13000906.1-1707, Applicant Joseph Voegele AG, 7 Pages.
Japanese Office Action Dated Feb. 17, 2015, Application No. 2014-020525, Reference No. GM1401010, Dispatch No. 070253, 3 Pages.
Japanese Office Action Dated Feb. 10, 2015, Application No. 2014-020521, Reference No. GM1401003, Dispatch No. 063490, 5 Pages.
Co-Pending United States Patent Application "Drive Shaft Module for a Construction Machine", U.S. Appl. No. 14/186,347, 12 Pages.
Office Action Dated Jan. 14, 2015, U.S. Appl. No. 14/186,347, filed Feb. 21, 2014, 18 Pages.
Amendment Under 37 C.F.R. 1.111 Dated Apr. 14, 2015, U.S. Appl. No. 14/186,37, 11 Pages.
Chinese First Office Action Dated Aug. 4, 2015, Application No. 201410062804.4, Applicant Joseph Fu Gele Company, 5 Pages.
Japanese Office Action Dated Aug. 18, 2015, Application No. 2014-020525, 3 Pages.
Office Action Dated Jul. 14, 2015, U.S. Appl. No. 14/186,347, 24 Pages.
U.S. Notice of Allowance Office Action Dated Nov. 3, 2015, U.S. Appl. No. 14/186,347, 11 Pages.
"Friction Welding Vehicle Drive Shafts", YouTube Video Uploaded by Thompson Friction Welding Ltd. on Oct. 14, 2008, https://www.youtube.com/watch?v=uURIXuUt5-k&feature=youtu.be., 2 Pages, and video viewable online at https://www.youtube.com/watch?v=uURIXuUt5-k.
"Inertia Friction Welding Demonstration—Manufacturing Technology, Inc.", YouTube Video Uploaded by Manufacturing Technology, Inc. on Jan. 18, 2009, https://www.youtube.com/watch?v=-aEuAK8bsQg&feature=youtu.be., 3 Pages, and video viewable online at https://www.youtube.com/watch?v=-aEuAK8bsQg.
Wikipedia page "Friction Welding", Dated Jan. 20, 2013, https:/en.wikipedia.org/w/index.php?title=Friction_welding&oldid=534022948, 3 Pages.
Article from Pavement Interactive "Viscosity Grading", Dated Aug. 16, 2007, http://www.pavementinteractive.org/article/viscosity-grading/, 2 Pages.
Article from Pavement Interactive "Gradation and Size", Dated Jun. 5, 2009, http://www.pavementinteractive.org/article/gradation-and-size/, 4 Pages.
Article from Pavement Interactive "Ashphalt Paver", Dated Apr. 7, 2009, http://www.pavementinteractive.org/article/asphalt-paver/, 5 Pages.
Matthew Reckard, P.E. & John Reyer, P.E., Asphalt Pavement Inspector's Manual, Alaska Department of Transportation and Public Facilities, Jul. 2002, Third Edition, 170 Pages.
Brochure: Volvo Tracked Pavers P7820C ABG, P8820C ABG, published by Volvo Construction Equipment 2012, 16 Pages.
Brochure: Dynapac Large Wheeled Paver Range, Dynapac SD2500W/SD2500WS, Dynapac GmbH (No Date Provided), 16 Pages.
Article from Project Scotland website "Stirling Company Gets First Paving Machine of its Kind in Scotland", http://www.projectscot.com/2012/12/sterling-company-gets-first-pavi . . . , Dated Dec. 2012, 4 Pages.
Notice of Opposition to European Patent No. 2 769 939 B1, European Patent Application No. 13000906.1, Applicant Joseph Vögele AG, Opponent: Caterpillar, Inc., Dated Dec. 29, 2015, 20 Pages.

\* cited by examiner

CONVEYOR SCREW FOR A MATERIAL CONVEYOR SYSTEM OF A CONSTRUCTION MACHINE

CROSS-REFERENCE TO RELATED APPLICATIONS

This application claims foreign priority benefits under 35 U.S.C. §119(a)-(d) to European patent application number EP 13000906.1, filed Feb. 22, 2013, which is incorporated by reference in its entirety.

TECHNICAL FIELD

The disclosure relates to a conveyor screw for a material conveyor system of a construction machine and to a material conveyor system and a construction machine where it is employed.

BACKGROUND

Such conveyor screws are known from practice. They are mainly used for conveying bulk material. In the process, the conveyor screws are caused to rotate. The driving torque required for this is normally transmitted from a force application element fixed to the conveyor screw shaft. For mounting this force application element to the conveyor screw shaft, normally different shaft-hub connections are employed. These include, for example, splined shaft toothing, force fits, or key-and-slot joints. This type of connections causes high manufacture and assembly costs and efforts. The multi-part design and the resulting friction between the components additionally cause wear.

SUMMARY

It is therefore an object of the disclosure to provide an improved conveyor screw for a material conveyor system of a construction machine of which the design is improved in the simplest possible way in order to reduce or completely eliminate the mentioned disadvantages.

The conveyor screw according to the disclosure is characterized in that a conveyor section which is configured to convey bulk material, and a driving section which is configured to receive a driving torque or a driving force and to transmit it to the conveyor section, are connected to each other by friction welding. The connection of the two sections by means of friction welding offers several advantages. On the one hand, the material bond prevents a relative motion between the components and thus reduces wear by friction. On the other hand, no complex shaft-hub connections are required any longer, such as splined shafts, force fits, or key-and-slot joints. Consequently, the manufacturing efforts that these connections involve are also eliminated.

It may be advantageous for the conveyor section and the driving section to be made of different materials. Here, a further advantage of the connection by means of friction welding comes into effect. In contrast to other methods involving material bonds, most diverse material combinations may be materially connected. The conveyor section on the one hand and the driving section on the other hand may thereby be optimized towards their respective desired applications. Their materials may in particular vary as to hardness, surface hardness, density, weight, costs, corrosion resistance and resistance towards optionally used lubricants, or towards the conveyed bulk material. Both materials may be metallic.

It is conceivable for the material of which the conveyor section is made to have a higher strength than the material of which the driving section is made.

It is suitable for the material of which the conveyor section is made to have a higher hardness or surface hardness than the material of which the driving section is made. In this manner, one can prevent increased wear of the conveyor section resulting from friction between its surface and the conveyed bulk material without it being necessary for the driving section to simultaneously go through the same, possibly expensive, hardening procedure.

It is advantageous for the conveyor screw to be suited for high application temperatures, preferably temperatures of at least 150° C., particularly preferred temperatures of more than 200° C. The conveyor screw is accordingly suited for such application temperatures when the component and/or material properties of the conveyor screw do not disadvantageously change within this temperature range. Such disadvantageous changes include, for example, a significant reduction in strength, deformation, an accelerated oxidation of the conveyor screw, an embrittlement of the screw material, or the acceleration of ageing processes which would shorten the service life of the conveyor screw.

Advantageously, the conveyor screw is suited for conveying bulk material having a graining within a range of between 0 mm and 180 mm, preferably between 0 mm and 120 mm, particularly preferred between 0 mm and 80 mm. The suitability for conveying bulk materials of a certain graining here essentially depends on geometric parameters of the conveyor screw, e. g. the lead, surface finish, blade diameter, or else the pitch of the screw thread.

It showed to be advantageous for the conveyor screw to be designed for speeds within a range of between 0 rpm (rpm=revolutions per minute) and 250 rpm, preferably between 0 rpm and 125 rpm. Such speeds have proved their worth in practice. It is therefore advantageous for component parameters, e.g., the moment of inertia or the frequency of resonance of the conveyor screw, to be adapted to this speed range.

It is moreover conceivable for the conveyor screw to be suited for conveying bulk material having a viscosity within a range of between $10^5$ and $10^{18}$ mPa·s (millipascal-second). To this end, the screw must have a corresponding strength. Moreover, a suited surface finish and in particular surface roughness must be provided. Here, different non-stick measures, e.g., coatings, are also conceivable. A corresponding pitch of the screw thread can also have a positive influence on the suitability for conveying such materials.

It is particularly advantageous for the conveyor screw to be suited for conveying bituminous mixed materials, in particular asphalt. Here, too, a corresponding strength of the conveyor screw must be provided due to the toughness of such materials. It may equally be advantageous to counteract the adhesion tendency of bituminous mixed materials, for example by providing a corresponding surface finish or roughness. Here, too, anti-stick measures, such as coatings, are conceivable. The adaptation of the pitch of the screw thread may also have a positive effect on the suitability for conveying bituminous mixed materials, in particular asphalt.

In one variant, a material conveyor system for a construction machine that processes or transports bulk material comprises at least one conveyor screw according to the disclosure, the use of several conveyor screws may here in particular be suitable for relatively large machines or volumetric displacements. In processes of thorough mixing, the use of several conveyor screws may also be advantageous.

It proved to be suitable for the speed of at least one conveyor screw to be continuously variable. In this manner, the discharge may be purposefully adapted. When several conveyor screws are used, the material flow in different directions may moreover be purposefully controlled. When several conveyor screws are used, it is particularly advantageous if the speed of the respective conveyor screws may be adjusted independently.

It is moreover advantageous to be able to make adjustments during operation.

In a further variant, these conveyor screws may be operable independently in a material conveyor system using several conveyor screws. Thereby, the material flow may be purposefully influenced. Additionally, possible inhomogeneities of the material with respect to temperature or graining distribution may be compensated by a selective thorough mixing process.

It is moreover conceivable that a construction machine for processing or for transporting bulk material comprises an above described material conveyor system.

In one variant, this construction machine is a road finishing machine or a feeder.

The material conveyor system might be employed in the construction machine as a transverse conveyor system and/or as a longitudinal conveyor system.

Below, an advantageous embodiment of the disclosure will be illustrated with reference to the attached drawings.

DETAILED DESCRIPTION

Figure 1:
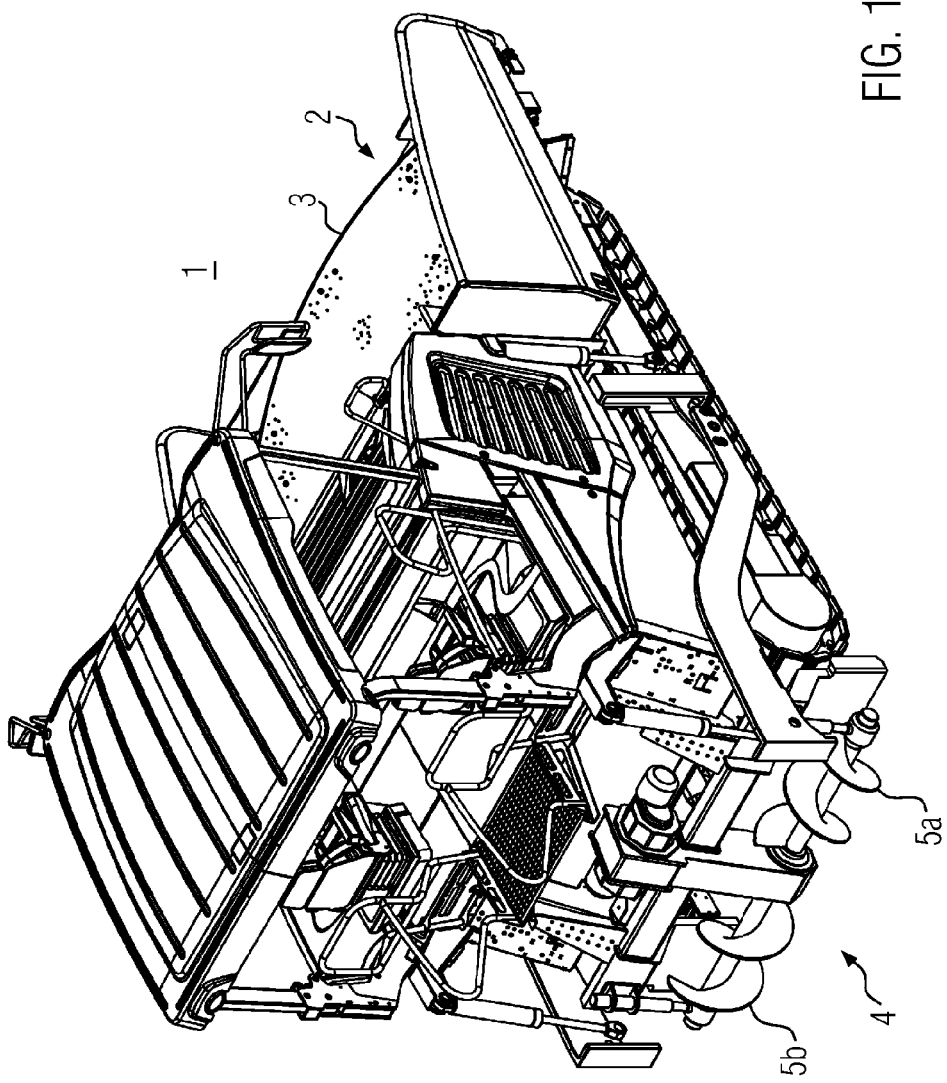
FIG. 1 shows a perspective view of a construction machine, in this case a road finishing machine, in which a material conveyor system according to the disclosure and a conveyor screw according to the disclosure are installed.

FIG. 1 represents a construction machine 1, in this embodiment a road finishing machine, in a perspective view from the rear right in the direction of travel. Bulk material 3, in this case asphalt, is placed in a material bunker 2 disposed in the front in the direction of travel. Said material is conveyed to the rear against the direction of travel by a longitudinal conveyor system (not visible). There, it is distributed transversely to the direction of travel of the construction machine by a further material conveyor system 4 which will be referred to as transverse conveyor system 4 below. In the shown embodiment, two conveyor screws 5 according to the disclosure are employed for this. Then, the asphalt is smoothened and compacted by a non-depicted screed, so that a plane layer of asphalt is formed.

The embodiment shows the material conveyor system 4 by way of example as a transverse conveyor system 4. However, it is also possible to employ the material conveyor system 4 as a longitudinal conveyor system. It is moreover possible for the material conveyor system 4 to comprise more than two conveyor screws 5, or only one conveyor screw 5. Moreover, the conveyor screws 5 according to the disclosure may be suited for conveying any bulk material 3 and not only for conveying asphalt, as described in the embodiment.

Figure 2:
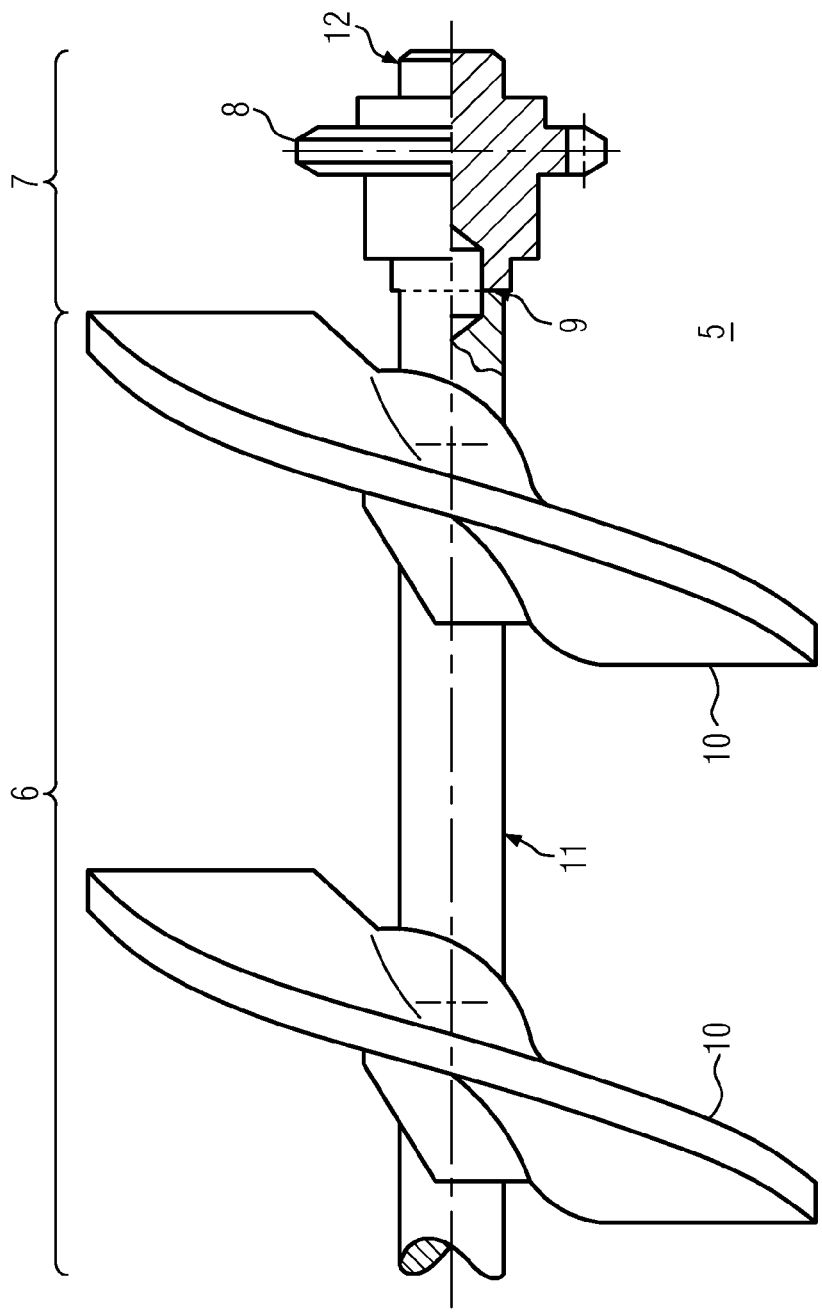
FIG. 2 shows a conveyor screw according to the disclosure.

FIG. 2 shows a conveyor screw 5 according to the disclosure. It comprises a conveyor section 6 and a driving section 7. The conveyor section 6 is provided for conveying the bulk material 3. The driving section 7 is configured to receive a driving force or a driving torque, to transmit it to the conveyor section and to thus cause the latter to rotate. In the shown embodiment, the driving section 7 comprises a gearwheel 8 to this end. The latter may be driven by a non-depicted further gearwheel, or by a neither depicted chain. Instead of a gearwheel 8, however, transmission elements of different types are just as well conceivable, e.g., belt disks. The driving section 7 is connected to the conveyor section 6 at the friction weld 9. In FIG. 2, the conveyor section 6 comprises two flank elements 10 which further convey the bulk material 3 by rotation of the screw 5. However, it is also conceivable for the conveyor section 6 to comprise a continuous flank.

The conveyor section 6 may be made of a first material 11, and the driving section 7 of a second material 12. The materials 11, 12 may be the same materials. It is, however, advantageous for the first material 11 to be adapted to the requirements on the conveyor section 6, and the second material 12 to the requirements on the driving section 7. The first material 11 may have, for example, a higher hardness or surface hardness than the second material 12 to prevent wear due to friction with the bulk material 3. Moreover, the materials 11, 12 may differ with respect to their densities, costs, corrosion resistance, resistance towards lubricants or the conveyed bulk material, adhesion tendency, or tendency to galling.

In a case where the gearwheel 8 is driven by a further gearwheel, it is, for example, very important for the material 12 of which the gearwheel 8 is made not to tend to gall with a material of which the other gearwheel is made. It is, however, irrelevant whether the material 11 of which the conveyor section 6 is made tends to gall with the material of which the other gearwheel is made as these materials do not contact each other. Reversely, it is very important for the material 11 of which the conveyor section 6 is made to be resistant to the bulk material 3 and to have a low adhesion tendency with respect to it. In contrast, it is irrelevant whether the material 12 of which the driving section 7 is made tends to adhere to the bulk material 3, or whether it is less resistant to it as it normally does not contact it.

In the present embodiment, the conveyor screw is suited for application temperatures of at least 200° C. This value may, however, be adapted to the processing temperature of the respective bulk material 3. If, for example, warm mix asphalts or cold mix asphalts are used, it may be sufficient for the conveyor screw to withstand application temperatures of 100° C. or 150° C. without any essential changes in its properties. Important properties that must not be affected at the respective application temperature are, among others, strength, oxidation tendency, and the brittleness of the material. Moreover, ageing processes that reduce the service life of the conveyor screw must not be accelerated.

The conveyor screw in the embodiment is suited for conveying bulk material having a graining within a range of between 0 mm and 180 mm. This means it may e.g., have a corresponding lead which is large enough to receive the largest bulk material particles, but also narrow enough to ensure efficient conveyance. Moreover, the surface could be such that bulk material particles do not adhere to the flank elements 10. Moreover, it is advantageous for the diameter of the screw flank to ensure that particles of the bulk material 3 do not unintentionally escape from the conveyor screw 5. It may moreover be suitable to provide, depending on the selected lead, an adequate pitch of the screw thread.

The conveyor screw 5 in the present embodiment is designed for speeds within a range of between 0 rpm and 250 rpm. However, it is also possible to provide other speed ranges, e.g., within a range of between 0 rpm and 125 rpm. For this, a corresponding moment of inertia may be provided for the screw 5, for example. It may moreover be advantageous for the frequency of resonance of the rotating conveyor screw 5 to be outside the provided speed range.

The speed of the conveyor screw 5 may be varied continuously during operation. Thereby, the volumetric displacement of the conveyor screw 5 may be purposefully adapted to the demand.

The material conveyor system 4 or the construction machine 1 may comprise any number of conveyor screws 5. In the shown embodiment, two conveyor screws 5*a* and 5*b* are provided. These may be operated independently, i.e., the speed of the conveyor screw 5*a* may be adjusted independently of the speed of the conveyor screw 5*b* and vice-versa. Thereby, a difference in the material demand between the two sides of the road finishing machine may be taken into consideration when the road finishing machine 1 is driving through a curve. If the conveyor screw 5*a* is located, for example, on the outer side of the curve, it must run at a higher speed than the conveyor screw 5*b* located on the inner side of the curve as a longer distance must be passed on the outer side of the curve and therefore material demand is higher. Moreover, unnecessary material accumulations which are detrimental to the later road pavement quality may be prevented at the conveyor screw 5*b* at the inner side of the curve.

The above embodiment was described with reference to a road finishing machine. It may, however, just as well be realized at any desired construction machine, in particular a feeder.

The material conveyor system 4 may convey the bulk material 3 into any direction with respect to the direction of travel of the construction machine 1, e.g., longitudinally to the direction of travel, or transversely to the direction of travel, as described in the embodiment.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A conveyor screw for a material conveyor system of a road finishing machine or a feeder, the conveyor screw comprising:
    a conveyor section configured to convey bulk material; and
    a driving section designed to receive a driving torque or a driving force from the conveyor system of the road finishing machine or the feeder and to transmit the driving torque or the driving force to the conveyor section;
    wherein the conveyor section and the driving section each include a shaft portion, and the shaft portions are connected together at a connection location by a friction weld, and wherein the shaft portion of the driving section has a larger diameter than the shaft portion of the conveyor section at the connection location.

2. The conveyor screw according to claim 1 wherein the conveyor section and the driving section are made of different materials.

3. The conveyor screw according to claim 1 wherein the conveyor section is made of a material having a higher strength than material of which the driving section is made.

4. The conveyor screw according to claim 1 wherein the conveyor section is made of a material having a higher surface hardness than material of which the driving section is made.

5. The conveyor screw according to claim 1 wherein the conveyor screw is designed for application temperatures of at least 100° C.

6. The conveyor screw according to claim 1 wherein the conveyor screw is designed for conveying bulk material having a graining between 0 and 180 mm.

7. The conveyor screw according to claim 1 wherein the conveyor screw is designed for speeds within a range of between 0 and 250 revolutions per minute.

8. The conveyor screw according to claim 1 wherein the conveyor screw is designed for conveying bulk material having a viscosity within a range of between $10^5$ and $10^{18}$ mPa·s.

9. The conveyor screw according to claim 1 wherein the conveyor screw is designed for conveying bituminous mixed material.

10. A material conveyor system for a road finishing machine or a feeder, wherein the material conveyor system comprises at least one conveyor screw according to claim 1.

11. The material conveyor system according to claim 10 wherein speed of the at least one conveyor screw may be continuously variable during operation.

12. The material conveyor system according to claim 10 wherein the conveyor system comprises a plurality of the conveyor screws, and the conveyor screws may be operated independently.

13. A road finishing machine or a feeder comprising:
    at least one material conveyor system having a conveyor screw, the conveyor screw comprising a conveyor section configured to convey bulk material, and a driving section designed to receive a driving torque or a driving force and to transmit the driving torque or the driving force to the conveyor section, wherein the conveyor section and the driving section each include a shaft portion, and the shaft portions are connected together at a connection location by a friction weld, and wherein the shaft portion of the driving section has a larger diameter than the shaft portion of the conveyor section at the connection location.

14. The road finishing machine or feeder according to claim 13 wherein the at least one material conveyor system may be employed as at least one transverse conveyor system or as at least one longitudinal conveyor system.

15. The road finishing machine or feeder according to claim 13 wherein the conveyor screw is designed for application temperatures of at least 100° C.

16. The road finishing machine or feeder according to claim 13 further comprising a material bunker for receiving bulk material to be conveyed by the at least one conveyor system.

* * * * *